US009462318B2

(12) United States Patent
Cassanova et al.

(10) Patent No.: US 9,462,318 B2
(45) Date of Patent: Oct. 4, 2016

(54) SYSTEM FOR MEDIA PROGRAM MANAGEMENT

(75) Inventors: Jeffrey Cassanova, Villa Rica, GA (US); Nicholas Peter Hill, Atlanta, GA (US); Virginia Ng, Lawrenceville, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 557 days.

(21) Appl. No.: 12/611,355

(22) Filed: Nov. 3, 2009

(65) Prior Publication Data

US 2011/0107370 A1    May 5, 2011

(51) Int. Cl.
  *H04N 7/16* (2011.01)
  *H04N 21/41* (2011.01)
  *H04N 21/4147* (2011.01)
  *H04N 21/433* (2011.01)
  *H04N 21/472* (2011.01)
  *H04N 21/643* (2011.01)

(52) U.S. Cl.
  CPC ...... *H04N 21/4126* (2013.01); *H04N 21/4147* (2013.01); *H04N 21/4334* (2013.01); *H04N 21/47202* (2013.01); *H04N 21/64322* (2013.01)

(58) Field of Classification Search
  CPC .............. H04N 7/163; H04N 5/4401; H04N 21/4126; H04N 21/4722; H04N 5/775
  USPC .................. 725/9, 13–21, 62, 133, 141, 153
  See application file for complete search history.

(56) References Cited

U.S. PATENT DOCUMENTS

| | | | |
|---|---|---|---|
| 5,805,763 A * | 9/1998 | Lawler et al. | 386/296 |
| 6,133,909 A * | 10/2000 | Schein et al. | 715/721 |
| 6,240,555 B1 * | 5/2001 | Shoff et al. | 725/110 |
| 6,323,911 B1 * | 11/2001 | Schein et al. | 348/552 |
| 8,122,094 B1 * | 2/2012 | Kotab | 725/87 |
| 8,528,019 B1 * | 9/2013 | Dimitrova et al. | 725/46 |
| 2002/0059596 A1 * | 5/2002 | Sano et al. | 725/39 |
| 2002/0120925 A1 * | 8/2002 | Logan | 725/9 |
| 2003/0093794 A1 * | 5/2003 | Thomas et al. | 725/46 |
| 2004/0139465 A1 * | 7/2004 | Matthews et al. | 725/51 |
| 2005/0132420 A1 * | 6/2005 | Howard et al. | 725/135 |
| 2007/0172155 A1 * | 7/2007 | Guckenberger | 382/305 |
| 2007/0220540 A1 * | 9/2007 | Walker et al. | 725/14 |
| 2007/0286463 A1 * | 12/2007 | Ritzau et al. | 382/118 |
| 2008/0098432 A1 * | 4/2008 | Hardacker et al. | 725/51 |
| 2008/0244675 A1 * | 10/2008 | Sako et al. | 725/114 |
| 2009/0083808 A1 * | 3/2009 | Morrison | 725/87 |
| 2009/0119701 A1 * | 5/2009 | Aldrey et al. | 725/32 |
| 2010/0067750 A1 * | 3/2010 | Matsuo et al. | 382/118 |
| 2010/0083317 A1 * | 4/2010 | Inagaki et al. | 725/44 |
| 2010/0107189 A1 * | 4/2010 | Steelberg et al. | 725/32 |
| 2010/0251299 A1 * | 9/2010 | Scott et al. | 725/39 |
| 2010/0260426 A1 * | 10/2010 | Huang | G06F 17/30247 382/218 |
| 2011/0055347 A1 * | 3/2011 | Hu et al. | 709/217 |

* cited by examiner

*Primary Examiner* — Jason Salce
(74) *Attorney, Agent, or Firm* — Guntin & Gust, PLC; Jay H. Anderson

(57) ABSTRACT

A system that incorporates teachings of the present disclosure may include, for example, a communication device having a controller to capture an image, and transmit the image to a system. The system can be operable to determine that the image corresponds to a media program, identify metadata associated with the media program, and transmit the metadata to a set-top box operable to display program information according to the metadata. Other embodiments are disclosed.

20 Claims, 9 Drawing Sheets

300

400

700

SYSTEM FOR MEDIA PROGRAM MANAGEMENT

FIELD OF THE DISCLOSURE

The present disclosure relates generally to media program management and more specifically to a system for media program management.

BACKGROUND

Frequently, media programs such as television shows are promoted in magazines, news articles, and programming guides. The promotions are intended to inform and motivate consumers to consume the promoted programs utilizing common media presentation devices such as a television, a cellular phone, a media player, or a computer.

DETAILED DESCRIPTION

One embodiment of the present disclosure can entail a communication device having a controller to capture an image, and transmit the image to a system. The system can be operable to determine that the image corresponds to a media program, identify metadata associated with the media program, and transmit the metadata to a set-top box (STB) operable to display program information according to the metadata.

One embodiment of the present disclosure can entail a system having a controller to receive an image, identify a media program associated with the image, identify programming information associated with the identified media program, and transmit the programming information to a network element of an interactive media programming system.

One embodiment of the present disclosure can entail a computer-readable storage medium having computer instructions to receive programming information associated with a media program, wherein the programming information is determined from a captured image.

Figure 1:
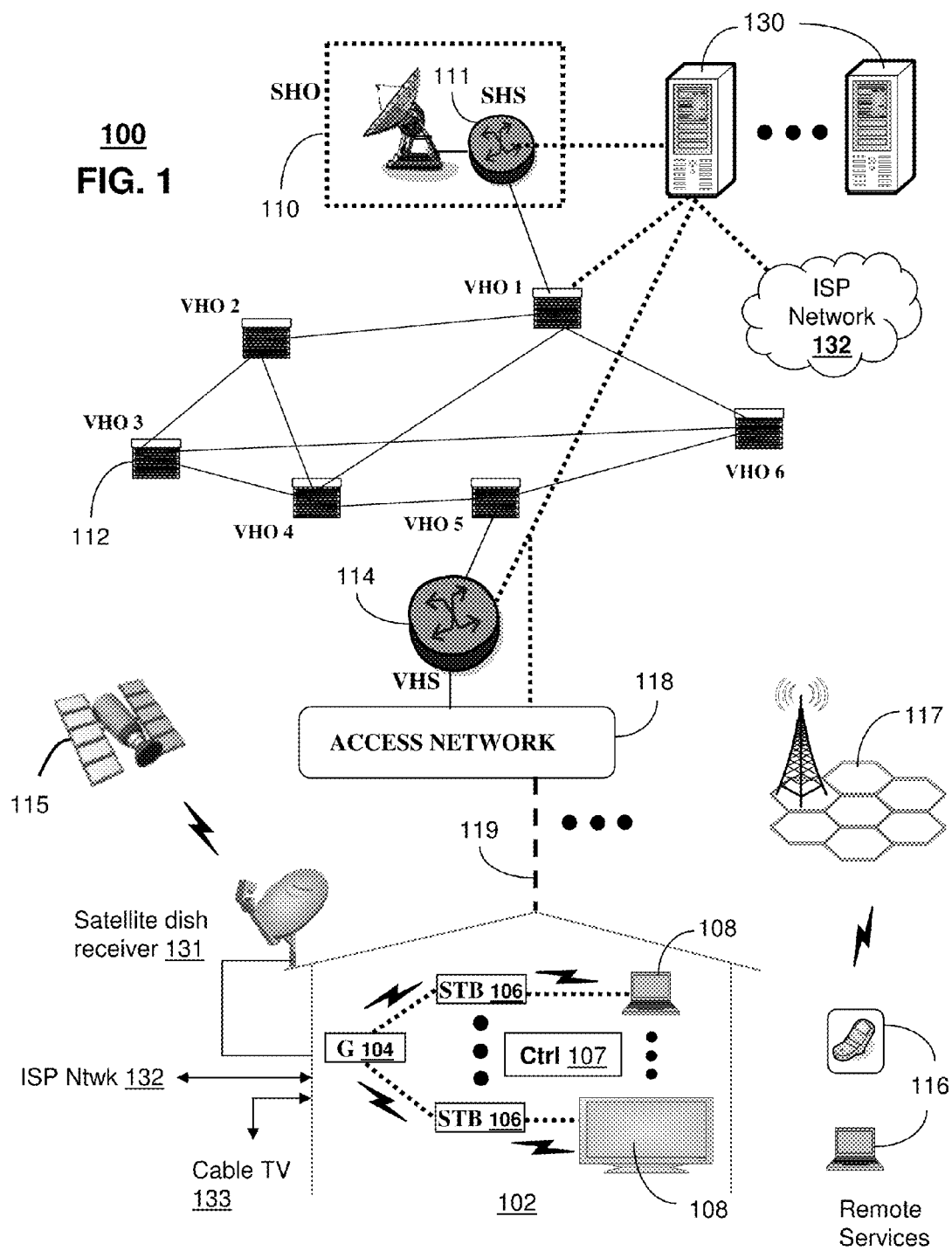
FIGS. 1-2 depict illustrative embodiments of communication systems that provide media services.

FIG. 1 depicts an illustrative embodiment of a first communication system 100 for delivering media content. The communication system 100 can represent an Internet Protocol Television (IPTV) broadcast media system. The IPTV media system can include a super head-end office (SHO) 110 with at least one super headend office server (SHS) 111 which receives media content from satellite and/or terrestrial communication systems. In the present context, media content can represent audio content, moving image content such as videos, still image content, or combinations thereof. The SHS server 111 can forward packets associated with the media content to video head-end servers (VHS) 114 via a network of video head-end offices (VHO) 112 according to a common multicast communication protocol.

The VHS 114 can distribute multimedia broadcast programs via an access network 118 to commercial and/or residential buildings 102 housing a gateway 104 (such as a common residential or commercial gateway). The access network 118 can represent a group of digital subscriber line access multiplexers (DSLAMs) located in a central office or a service area interface that provide broadband services over optical links or copper twisted pairs 119 to buildings 102. The gateway 104 can use common communication technology to distribute broadcast signals to media processors 106 such as Set-Top Boxes (STBs) which in turn present broadcast channels to media devices 108 such as computers or television sets managed in some instances by a media controller 107 (such as an infrared or RF remote control).

The gateway 104, the media processors 106, and media devices 108 can utilize tethered interface technologies (such as coaxial or phone line wiring) or can operate over a common wireless access protocol. With these interfaces, unicast communications can be invoked between the media processors 106 and subsystems of the IPTV media system for services such as video-on-demand (VoD), browsing an electronic programming guide (EPG), or other infrastructure services.

Some of the network elements of the IPTV media system can be coupled to one or more computing devices 130 a portion of which can operate as a web server for providing portal services over an Internet Service Provider (ISP) network 132 to wireline media devices 108 or wireless communication devices 116 by way of a wireless access base station 117 operating according to common wireless access protocols such as Wireless Fidelity (WiFi), or cellular communication technologies (such as GSM, CDMA, UMTS, WiMAX, Software Defined Radio or SDR, and so on). Another distinct portion of the computing devices 130 can function as a server (herein referred to as server 130). The server 130 can use common computing and communication technology to perform the function of identifying and associating media programs to images received from communication devices such as references 107, 108 and 116.

It will be appreciated by an artisan of ordinary skill in the art that a satellite broadcast television system can be used in place of the IPTV media system. In this embodiment, signals transmitted by a satellite 115 supplying media content can be intercepted by a common satellite dish receiver 131 coupled to the building 102. Modulated signals intercepted by the satellite dish receiver 131 can be submitted to the media processors 106 for generating broadcast channels which can be presented at the media devices 108. The media processors 106 can be equipped with a broadband port to the ISP network 132 to enable infrastructure services such as VoD and EPG described above.

In yet another embodiment, an analog or digital broadcast distribution system such as cable TV system 133 can be used in place of the IPTV media system described above. In this embodiment the cable TV system 133 can provide Internet, telephony, and interactive media services.

It follows from the above illustrations that the present disclosure can apply to any present or future interactive over-the-air or landline media content services.

Figure 2:
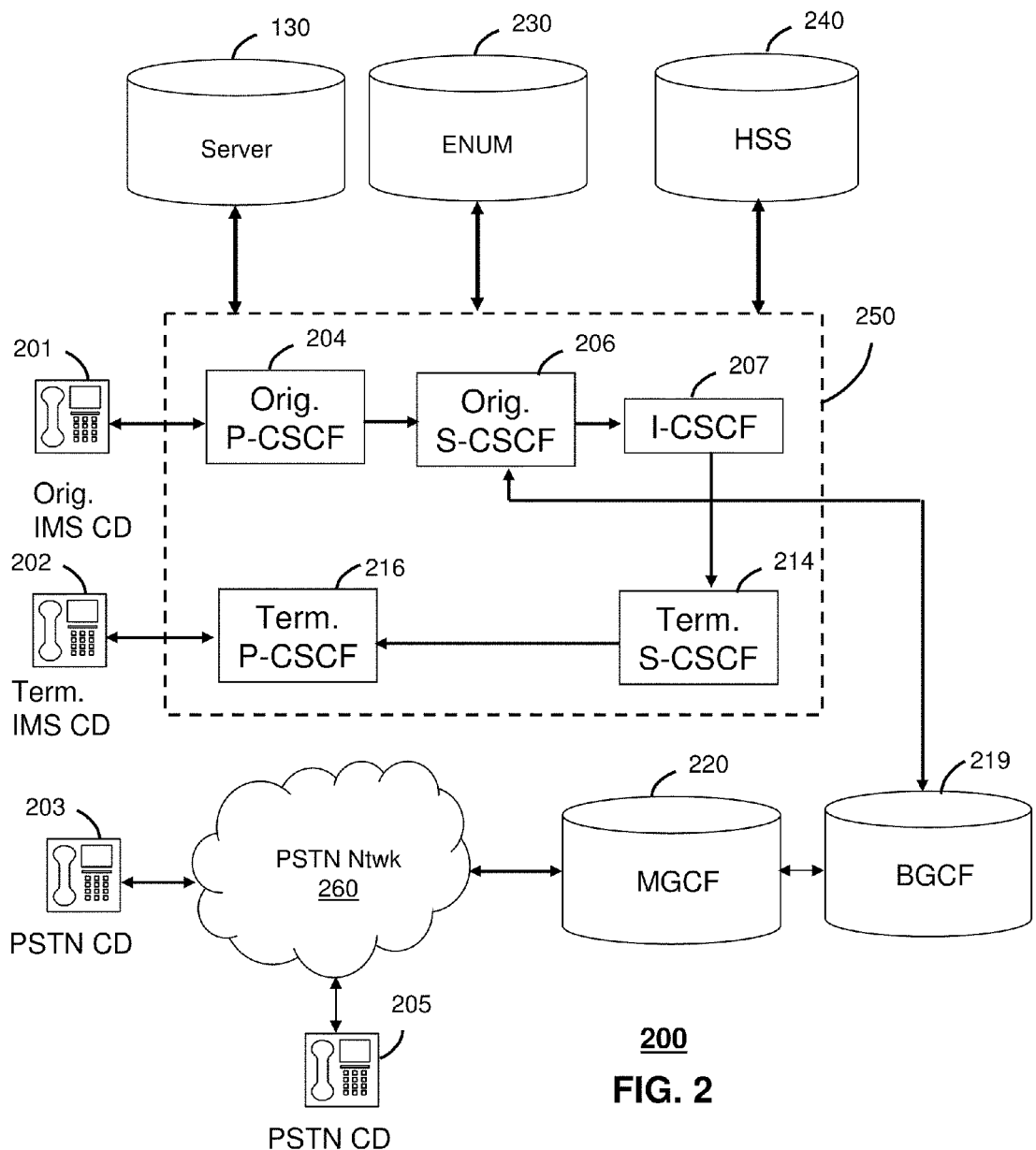

FIG. 2 depicts an illustrative embodiment of a communication system 200 employing an IP Multimedia Subsystem (IMS) network architecture to facilitate the combined services of circuit-switched and packet-switched systems. Communication system 200 can be overlaid or operably coupled with communication system 100 as another representative embodiment of communication system 100.

Communication system 200 can comprise a Home Subscriber Server (HSS) 240, a tElephone NUmber Mapping (ENUM) server 230, and other common network elements of an IMS network 250. The IMS network 250 can establish communications between IMS compliant communication devices (CD) 201, 202, Public Switched Telephone Network (PSTN) CDs 203, 205, and combinations thereof by way of a Media Gateway Control Function (MGCF) 220 coupled to a PSTN network 260. The MGCF 220 is not used when a communication session involves IMS CD to IMS CD communications. Any communication session involving at least one PSTN CD requires the use of the MGCF 220.

IMS CDs 201, 202 can register with the IMS network 250 by contacting a Proxy Call Session Control Function (P-CSCF) which communicates with a corresponding Serving CSCF (S-CSCF) to register the CDs with at the HSS 240. To initiate a communication session between CDs, an originating IMS CD 201 can submit a Session Initiation Protocol (SIP INVITE) message to an originating P-CSCF 204 which communicates with a corresponding originating S-CSCF 206. The originating S-CSCF 206 can submit queries to the ENUM system 230 to translate an E.164 telephone number in the SIP INVITE to a SIP Uniform Resource Identifier (URI) if the terminating communication device is IMS compliant.

The SIP URI can be used by an Interrogating CSCF (I-CSCF) 207 to submit a query to the HSS 240 to identify a terminating S-CSCF 214 associated with a terminating IMS CD such as reference 202. Once identified, the I-CSCF 207 can submit the SIP INVITE to the terminating S-CSCF 214. The terminating S-CSCF 214 can then identify a terminating P-CSCF 216 associated with the terminating CD 202. The P-CSCF 216 then signals the CD 202 to establish communications.

If the terminating communication device is instead a PSTN CD such as references 203 or 205, the ENUM system 230 can respond with an unsuccessful address resolution which can cause the originating S-CSCF 206 to forward the call to the MGCF 220 via a Breakout Gateway Control Function (BGCF) 219. The MGCF 220 can then initiate the call to the terminating PSTN CD by common means over the PSTN network 260.

The aforementioned communication process is symmetrical. Accordingly, the terms "originating" and "terminating" in FIG. 2 are interchangeable. It is further noted that communication system 200 can be adapted to support video conferencing. In addition, communication system 200 can be adapted to provide the IMS CDs 201, 203 the multimedia and Internet services of communication system 100.

The server 130 of FIG. 1 can be operably coupled to the second communication system 200 for purposes similar to those described above.

Figure 3:
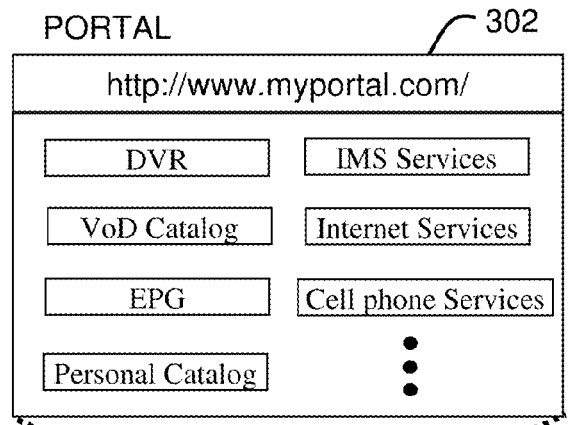
FIG. 3 depicts an illustrative embodiment of a portal interacting with the communication systems of FIGS. 1-2.
Figure 3:
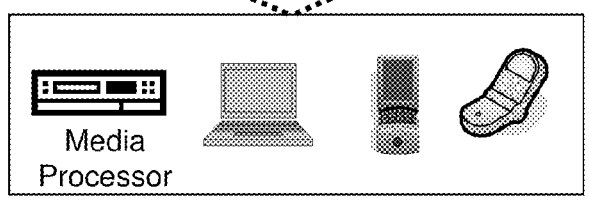

FIG. 3 depicts an illustrative embodiment of a portal 302 which can operate from the computing devices 130 described earlier of communication 100 illustrated in FIG. 1. The portal 302 can be used for managing services of communication systems 100-200. The portal 302 can be accessed by a Uniform Resource Locator (URL) with a common Internet browser such as Microsoft's Internet Explorer™ using an Internet-capable communication device such as those described for FIGS. 1-2. The portal 302 can be configured, for example, to access a media processor 106 and services managed thereby such as a Digital Video Recorder (DVR), a VoD catalog, an EPG, a personal catalog (such as personal videos, pictures, audio recordings, etc.) stored in the media processor, provisioning IMS services described earlier, provisioning Internet services, provisioning cellular phone services, and so on.

Figure 4:
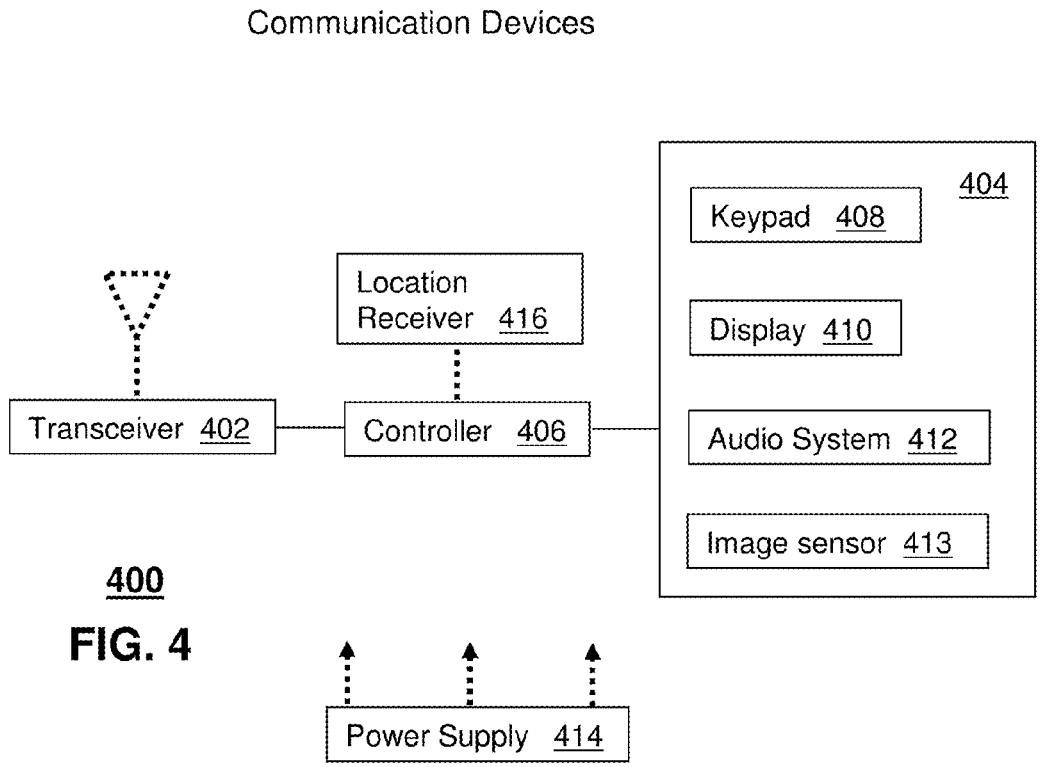
FIG. 4 depicts an illustrative embodiment of a communication device utilized in the communication systems of FIGS. 1-2.

FIG. 4 depicts an exemplary embodiment of a communication device 400. Communication device 400 can serve in whole or in part as an illustrative embodiment of the communication devices of FIGS. 1-2. The communication device 400 can comprise a wireline and/or wireless transceiver 402 (herein transceiver 402), a user interface (UI) 404, a power supply 414, a location receiver 416, and a controller 406 for managing operations thereof. The transceiver 402 can support short-range or long-range wireless access technologies such as Bluetooth, WiFi, Digital Enhanced Cordless Telecommunications (DECT), or cellular communication technologies, just to mention a few. Cellular technologies can include, for example, CDMA-1×, UMTS/HSDPA, GSM/GPRS, TDMA/EDGE, EV/DO, WiMAX, SDR, and next generation cellular wireless communication technologies as they arise. The transceiver 402 can also be adapted to support circuit-switched wireline access technologies (such as PSTN), packet-switched wireline access technologies (such as TCPIP, VoIP, etc.), and combinations thereof.

The UI 404 can include a depressible or touch-sensitive keypad 408 with a navigation mechanism such as a roller ball, joystick, mouse, or navigation disk for manipulating operations of the communication device 400. The keypad 408 can be an integral part of a housing assembly of the communication device 400 or an independent device operably coupled thereto by a tethered wireline interface (such as a USB cable) or a wireless interface supporting for example Bluetooth. The keypad 408 can represent a numeric dialing keypad commonly used by phones, and/or a Qwerty keypad with alphanumeric keys. The UI 404 can further include a display 410 such as monochrome or color LCD (Liquid Crystal Display), OLED (Organic Light Emitting Diode) or other suitable display technology for conveying images to an end user of the communication device 400. In an embodiment where the display 410 is touch-sensitive, a portion or all of the keypad 408 can be presented by way of the display.

The UI 404 can also include an audio system 412 that utilizes common audio technology for conveying low volume audio (such as audio heard only in the proximity of a human ear) and high volume audio (such as speakerphone for hands free operation). The audio system 412 can further include a microphone for receiving audible signals of an end user. The audio system 412 can also be used for voice recognition applications. The UI 404 can further include an image sensor 413 such as a charged coupled device (CCD) camera for capturing still or moving images.

The power supply 414 can utilize common power management technologies such as replaceable and rechargeable batteries, supply regulation technologies, and charging system technologies for supplying energy to the components of the communication device 400 to facilitate long-range or short-range portable applications. The location receiver 416 can utilize common location technology such as a global positioning system (GPS) receiver for identifying a location of the communication device 400 based on signals generated by a constellation of GPS satellites, thereby facilitating common location services such as navigation.

The communication device 400 can use the transceiver 402 to also determine a proximity to a cellular, WiFi or Bluetooth access point by common power sensing techniques such as utilizing a received signal strength indicator (RSSI) and/or a signal time of arrival (TOA) or time of flight (TOF). The controller 406 can utilize computing technologies such as a microprocessor, a digital signal processor (DSP), and/or a video processor with associated storage memory such a Flash, ROM, RAM, SRAM, DRAM or other storage technologies.

The communication device 400 can be adapted to perform the functions of the media processor 106, the media devices 108, or the portable communication devices 116 of FIG. 1, as well as the IMS CDs 201-202 and PSTN CDs 203-205 of FIG. 2. It will be appreciated that the communication device 400 can also represent other common devices that can operate in communication systems 100-200 of FIGS. 1-2 such as a gaming console and a media player.

Figure 5:
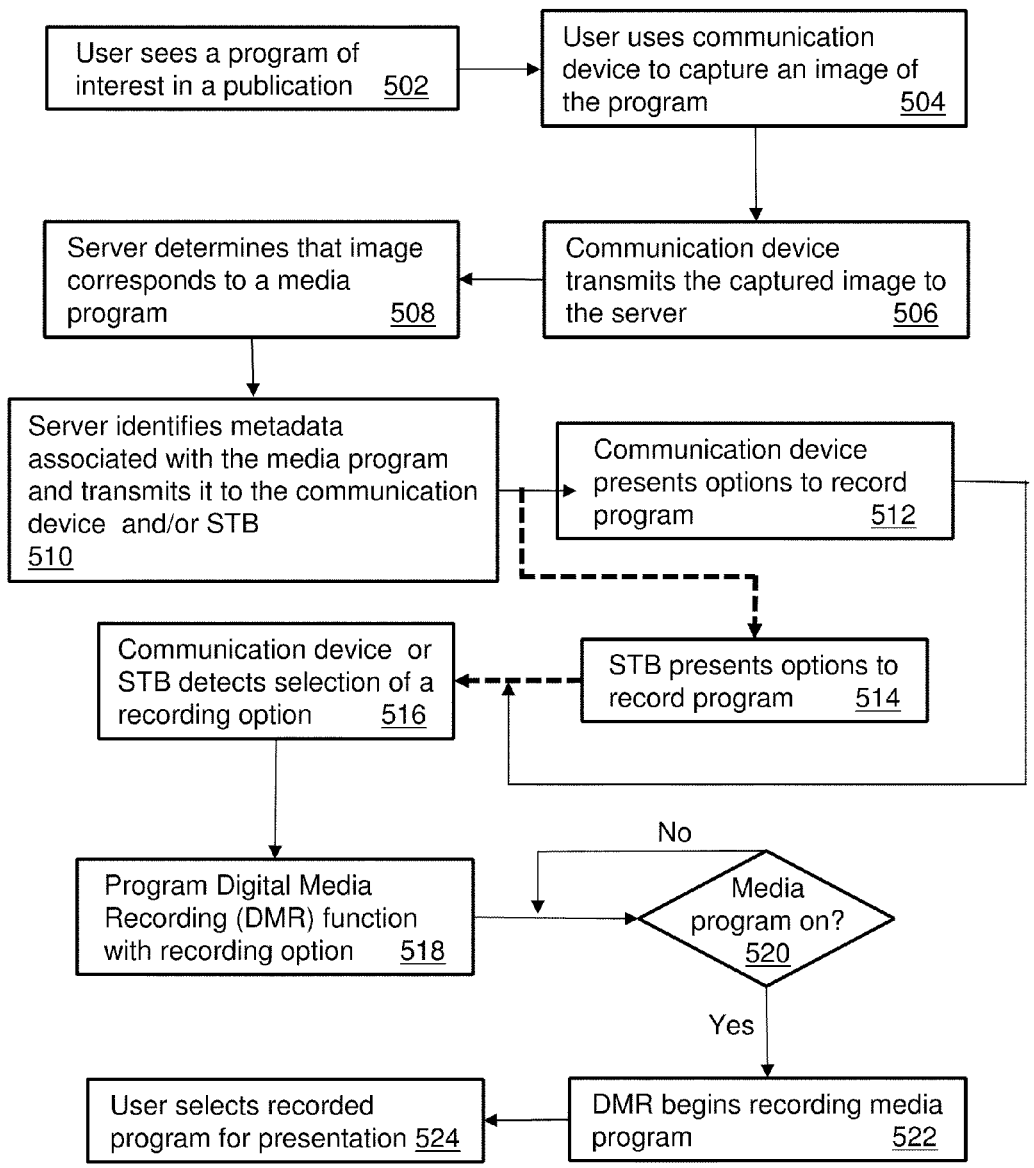
FIG. 5 depicts an illustrative embodiment of a method operating in portions of the communication systems of FIGS. 1-2.
Figure 6:
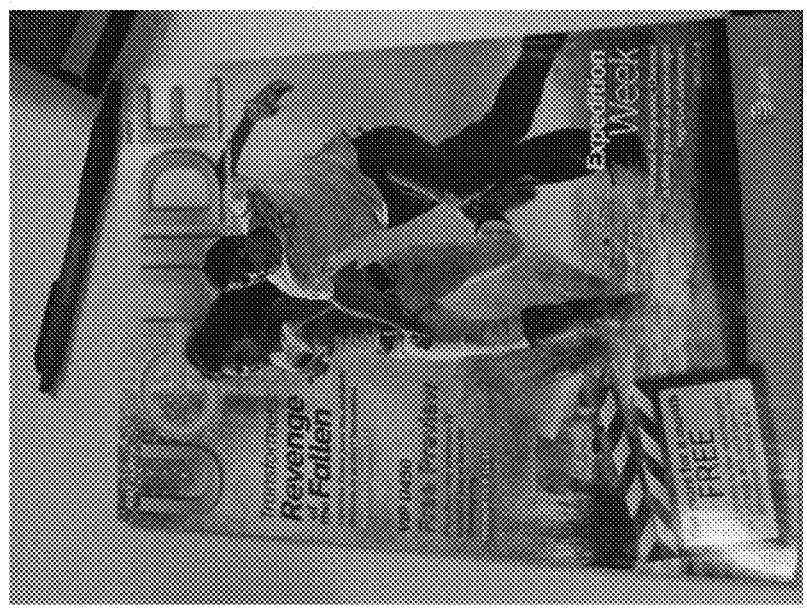

FIG. 5 depicts an illustrative method 500 that can operate in portions of the systems and devices described above. Method 500 can begin with step 502 in which a user sees a program of interest in a publication. FIG. 6 illustrates, for example, a magazine for viewing up-coming media programs of an iTV service provider. Rather than manually search an electronic programming guide (EPG) of the iTV system of FIG. 1, the user can use his or her communication device to capture in step 504 an image of the program presented in the magazine. The communication device can represent a cellular phone or a remote controller of an STB each having a common camera sensor as referred to in the descriptions of FIG. 4.

Figure 7:
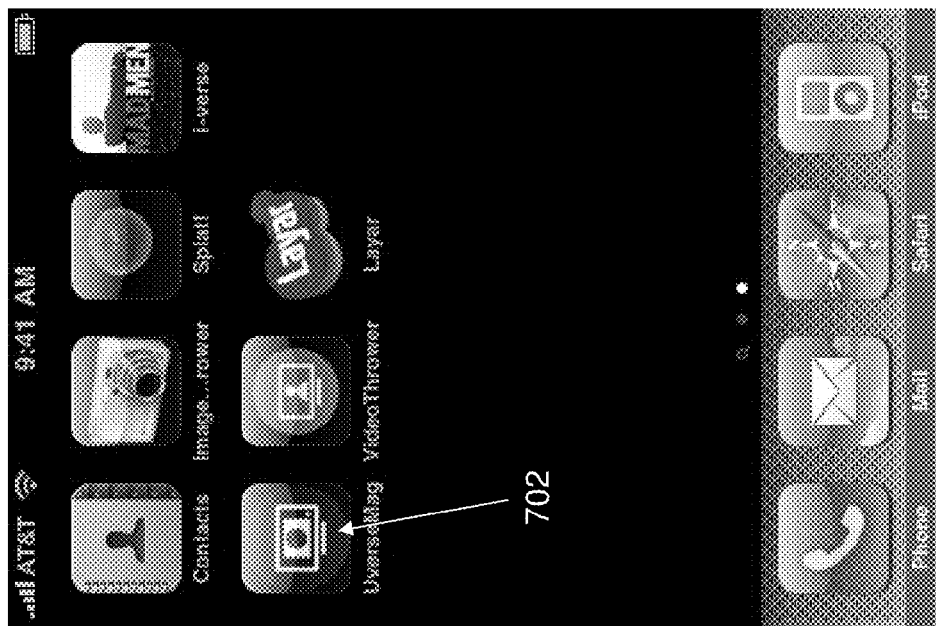
FIGS. 6-13 depict illustrative embodiments of the method of FIG. 5.
Figure 9:
Figure 8:
Figure 10:

In step 504, the user can for example select a software application 702 presented by the communication device as shown in FIG. 7 which when selected can invoke the camera function as shown in FIG. 8. Once the user has captured an image of a page in the magazine illustrating the program of interest to the user, the user can further validate in this step that the captured image is the one to be processed by selecting a "Use" button in FIG. 9. Once these actions are performed, the communication device in step 506 can transmit by wired or wireless communication means the captured image to the server 130 of the IPTV network of FIG. 1, and thereafter present a screen shot that indicates the image is being processed as shown in FIG. 10. The server 130 in step 508 can in turn utilize image recognition technology to determine that the image corresponds to a media program.

By way of the image recognition technology, the server 130 can specifically detect the presence of a person, place, thing, or combinations thereof. For instance, the server 130 can detect a person's face, compare the person's face to a database of commonly known celebrities (e.g., actors and actresses), and thereby identify a number of potential media programs associated with said person. Alternatively, or in combination, the server 130 can identify in the image a background that when compared with backgrounds of a number of known media programs, is sufficient to identify the media program based on similarities therebetween. The server 130 can also identify, and interpret text in the captured image to identify a name or links which point to the media program. The server 130 can also detect a distinctive barcode which can be used identify the media program.

From these illustrations, it would be apparent to an artisan with ordinary skill in the art that with common image recognition technology any number of identifiable objects can be detected in a captured image, and compared with a database of known objects to identify one or more related media programs. It should be noted that a media program in the present context can mean audio content (e.g., music, radio, etc.), still image content (e.g., photos, paintings, etc.), moving image content (e.g., video, movie, etc.), or combinations thereof.

Figure 11:
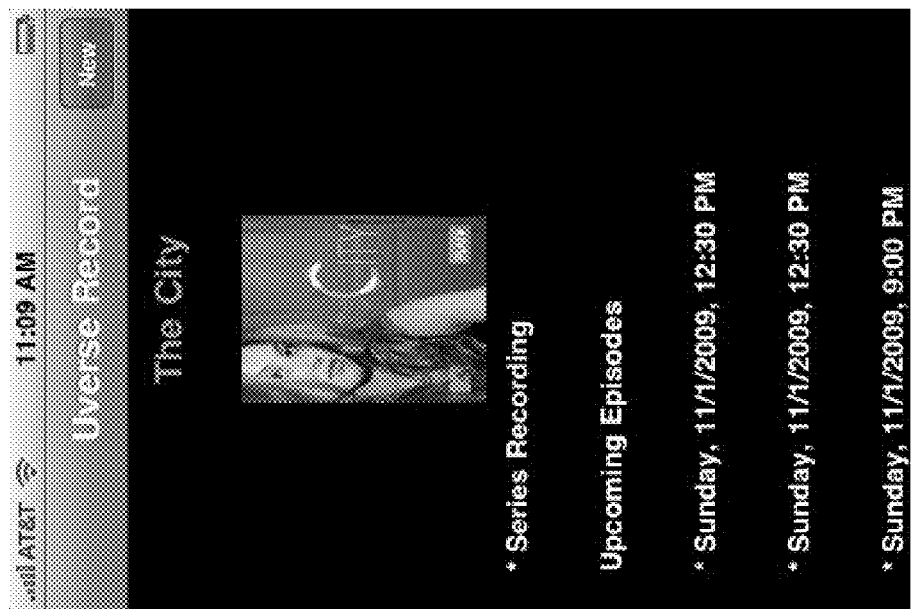

Once a media program has been found that substantially matches the content in the captured image, the server 130 proceeds to step 510 where it can identify or create metadata associated with the media program. The metadata for instance can describe the media program by title, performers, episode number, and so on. The metadata can also identify the scheduling times of the media program by time, date, and duration. The server 130 can transmit the metadata in this step to the communication device or the STB. When directed to the communication device, the communication device can present in step 512 the user the presentation schedule of the media program as shown in FIG. 11 with options to record any or all of the episodes. Alternatively, the server 130 can transmit the metadata to the user's STB where it can also present recording options to the user (illustration not shown).

Suppose for instance that the communication device or STB in step 516 detects that the user has chosen to record all episodes by one or more common graphic user interface (GUI) selections (e.g., selecting a button that says "Record All") presented by the communication device or STB. Once a selection of the recording option has been detected, the communication device or STB can direct in step 518 a digital media recorder (DMR) to record the episodes of the selected program. Since in this illustration the media program corresponds to a TV series ("The City"), the DMR can represent a common digital video recorder (DVR) function of the STB or a DVR device communicatively coupled to the STB.

Figure 13:
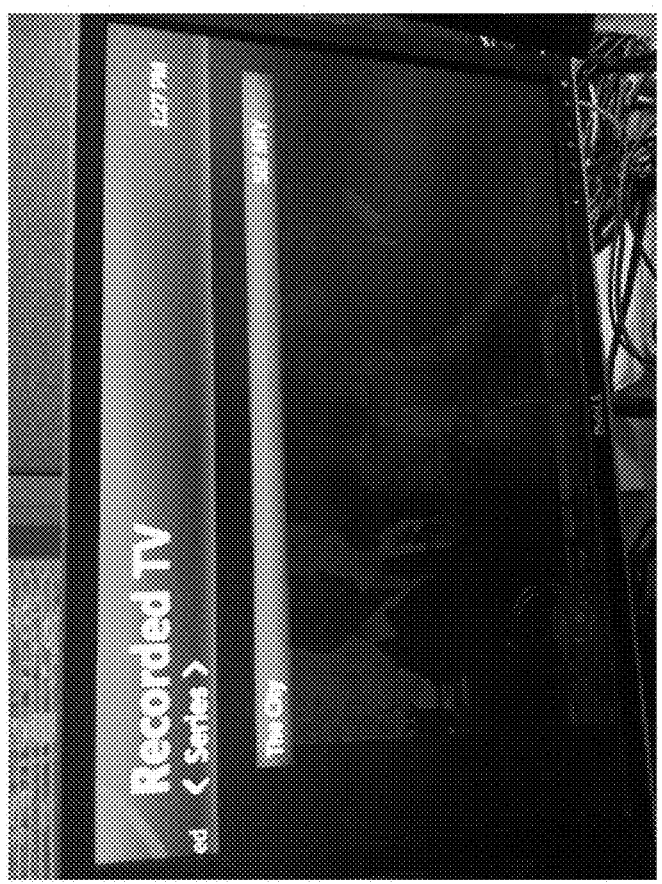
Figure 12:
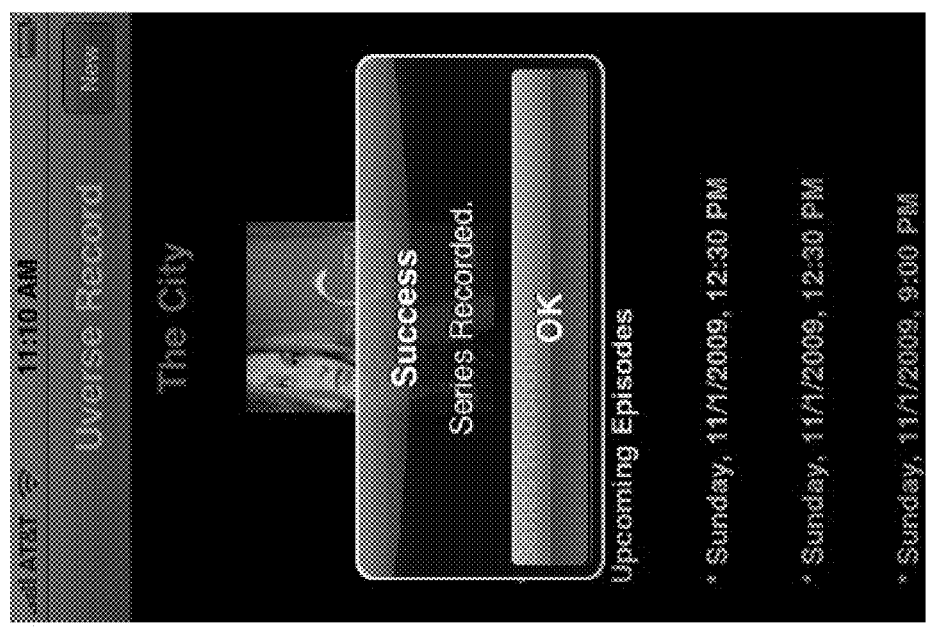

The communication device can communicate the selected recording option to the DVR, or the STB which would then direct the programming of the DVR. FIG. 12 illustrates a successful completion of programming the DVR. In step 520, the DVR can monitor the programming schedule of the selected media program. Once the DVR detects that the media program is about to begin, it can proceed to step 522 where it records the media program. In step 524, the user can select the recorded media program for presentation at the user's convenience by way of a presentation device (e.g., HD TV) shown in FIG. 13.

Upon reviewing the aforementioned embodiments, it would be evident to an artisan with ordinary skill in the art that said embodiments can be modified, reduced, or enhanced without departing from the scope and spirit of the claims described below. For example, method 500 can be adapted so that the communication device captures and processes the image itself and identifies the media program from an internal database. In another embodiment, the communication device can be adapted to transmit to the server 130 the captured image over a wireless network such as a WiFi or cellular network. In yet another embodiment, the media program identified from the image can be an audio program (e.g., radio talk show), or a collection of still images. Hence, the present disclosure is not limited to media programs of moving image content.

Other suitable modifications can be applied to the present disclosure without departing from the scope of the claims below. Accordingly, the reader is directed to the claims section for a fuller understanding of the breadth and scope of the present disclosure.

Figure 14:
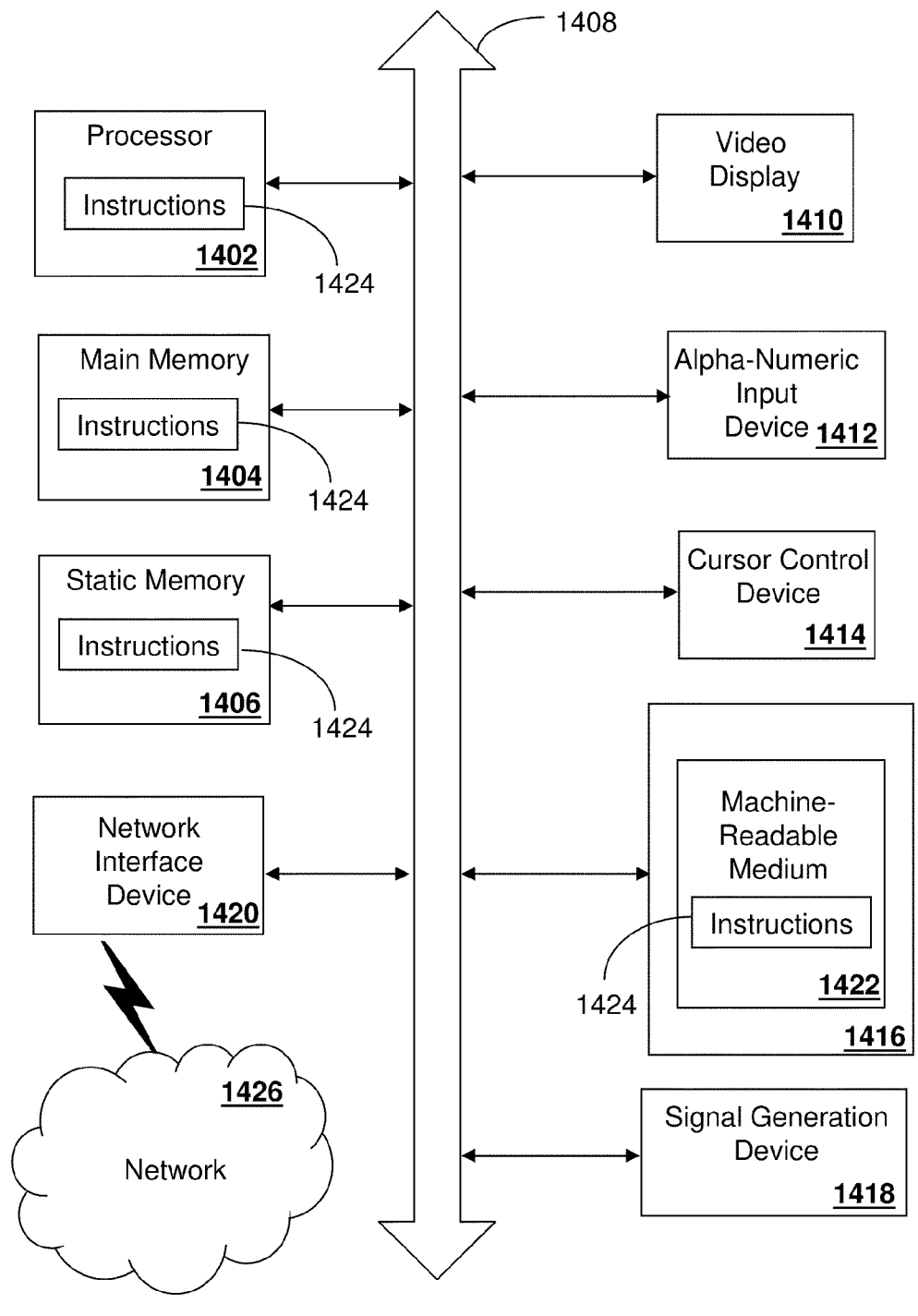
FIG. 14 is a diagrammatic representation of a machine in the form of a computer system within which a set of instructions, when executed, may cause the machine to perform any one or more of the methodologies discussed herein.

FIG. 14 depicts an exemplary diagrammatic representation of a machine in the form of a computer system 1400 within which a set of instructions, when executed, may cause the machine to perform any one or more of the methodologies discussed above. In some embodiments, the machine operates as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. It will be understood that a device of the present disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methodologies discussed herein.

The computer system 1400 may include a processor 1402 (e.g., a central processing unit (CPU), a graphics processing unit (GPU), or both), a main memory 1404 and a static memory 1406, which communicate with each other via a bus 1408. The computer system 1400 may further include a video display unit 1410 (e.g., a liquid crystal display (LCD), a flat panel, a solid state display, or a cathode ray tube (CRT)). The computer system 1400 may include an input device 1412 (e.g., a keyboard), a cursor control device 1414 (e.g., a mouse), a disk drive unit 1416, a signal generation device 1418 (e.g., a speaker or remote control) and a network interface device 1420.

The disk drive unit 1416 may include a machine-readable medium 1422 on which is stored one or more sets of instructions (e.g., software 1424) embodying any one or more of the methodologies or functions described herein, including those methods illustrated above. The instructions 1424 may also reside, completely or at least partially, within the main memory 1404, the static memory 1406, and/or within the processor 1402 during execution thereof by the computer system 1400. The main memory 1404 and the processor 1402 also may constitute machine-readable media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine readable medium containing instructions 1424, or that which receives and executes instructions 1424 from a propagated signal so that a device connected to a network environment 1426 can send or receive voice, video or data, and to communicate over the network 1426 using the instructions 1424. The instructions 1424 may further be transmitted or received over a network 1426 via the network interface device 1420.

While the machine-readable medium 1422 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present disclosure.

The term "machine-readable medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape; and/or a digital file attachment to e-mail or other self-contained information archive or set of archives is considered a distribution medium equivalent to a tangible storage medium. Accordingly, the disclosure is considered to include any one or more of a machine-readable medium or a distribution medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same functions are considered equivalents.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A system, comprising:
a memory that stores instructions; and
a controller coupled to the memory, wherein execution of the instructions by the controller causes the controller to perform operations, comprising:
receiving an image captured by a mobile phone configured to control operations of a set-top box as a remote controller, the image relating to a media program and corresponding to a static pictorial image of content derived from a printed publication;
detecting in the image a background of the image and a face of an actor associated with a group of media programs;
comparing the detected face to an actor database to identify the actor;
comparing the detected background of the image with a plurality of backgrounds of known media programs to identify similarities therebetween;
detecting an object in the image;
identifying the object;
identifying the media program based on a combination of the identified object, the identified similarities to the background of the image and an identity of the actor;
creating metadata associated with the media program based on the image and responsive to the media program being identified, wherein the metadata comprises descriptive information of the media program and a presentation schedule for the media program, and wherein the metadata enables the mobile phone to present the presentation schedule and a plurality of options for recording the media program, wherein the media program corresponds to a program series having episodes and the plurality of options includes recording all episodes of the program series; and
transmitting the metadata to the set-top box to enable the set-top box to present a description of the media program, the presentation schedule and the options for recording the media program according to the metadata,
wherein the transmitting further enables the mobile phone to perform a selection of a recording option for the media program, and to communicate the selection to the set-top box to direct the set-top box to record the media program.

2. The system of claim 1, wherein the mobile phone comprises a cellular phone.

3. The system of claim 1, wherein the image includes a barcode for identifying the media program.

4. The system of claim 1, wherein the image includes a media program description.

5. The system of claim 1, wherein the printed publication comprises a magazine.

6. The system of claim 1, wherein
identifying the media program comprises associating the object with the media program.

7. The system of claim 6, wherein the object comprises a person, place, or thing, wherein the system operates in an interactive television network, and wherein the mobile phone performs operations comprising programming a digital media recording function according to the presentation schedule provided in the metadata.

8. The system of claim 1, wherein the mobile phone receives a presentation of the media program.

9. The system of claim 1, wherein the media program corresponds to audio content, still image content, or moving image content.

10. A system, comprising:
a memory to store instructions; and
a controller coupled to the memory, wherein execution of the instructions by the controller causes the controller to perform operations, comprising:
receiving an image transmitted from a mobile phone in accordance with a validation input to the mobile phone, the mobile phone configured to control operations of a set-top box as a remote controller, the image relating to media programs and corresponding to a static pictorial image of content derived from a printed publication;
detecting in the image an object, a background of the image, and a face of an actor associated with a group of media programs;
comparing the detected face to an actor database to identify the actor;
comparing the detected background of the image with a plurality of backgrounds of known media programs to identify similarities therebetween;
identifying the object;
identifying the media programs based on the identified object, the identified similarities to the background of the image and an identity of the actor;
creating metadata associated with the identified media programs based on the image, the metadata comprising programming information, wherein the programming information comprises a presentation schedule for the media programs; and
transmitting the programming information to the set-top box to enable the set-top box to present a description of the media programs, the presentation schedule and a plurality of options for recording the identified media programs, wherein the media programs include a program series having episodes and the plurality of options includes recording all episodes of the program series,
wherein the transmitting further enables the mobile phone to perform a first selection of a media program from the group of media programs and a second selection of a recording option for the selected media program, to communicate the first selection and the second selection to the set-top box to direct the set-top box to record the selected media program, wherein the controller comprises a network element of an interactive media programming system, and wherein the image is captured by the mobile phone from a presentation other than the media program.

11. The system of claim 10, wherein the system operates in an interactive television system.

12. The system of claim 11, wherein the interactive television system corresponds to an interactive cable television system or an interactive satellite television system.

13. The system of claim 10, wherein the image includes a barcode for identifying the media programs.

14. The system of claim 10, wherein the image includes a media program description.

15. The system of claim 10, wherein the selected media program corresponds to audio content, still image content, moving image content, or a combination thereof, and wherein the network element corresponds to a media processor for presenting the selected media program.

16. The system of claim 10, wherein the object comprises a place or thing, and wherein identifying the media programs comprises associating the object with the media programs.

17. A non-transitory machine-readable storage medium, comprising executable instructions, which when executed by a processor, cause the processor to perform operations comprising:

identifying a group of media programs based on a captured image supplied by a mobile phone, the mobile phone configured to control operations of a set-top box as a remote controller, wherein the captured image relates to the media programs and corresponds to a static pictorial image of content derived from a printed publication, wherein the captured image includes an object associated with the group of media programs, wherein the identifying includes comparing the object with a plurality of objects associated with known media programs to identify similarities therebetween;

creating metadata comprising programming information associated with the media programs and based on the captured image, wherein the programming information comprises a presentation schedule for the media programs;

determining a plurality of options to record a media program of the group of media programs according to the programming information; and presenting a description of the media programs, the presentation schedule and the plurality of options via the set-top box, wherein the media program corresponds to a program series having episodes and the plurality of options includes recording all episodes of the program series, wherein the image is supplied in accordance with a validation input to the mobile phone subsequent to capture of the image, and wherein the image is captured from a presentation other than the media program.

18. The non-transitory machine-readable storage medium of claim 17, wherein the media program corresponds to audio content, still image content, moving image content, or a combination thereof.

19. The non-transitory machine-readable storage medium of claim 17, wherein the operations further comprise programming a digital media recorder according to a selection from the options for recording the media program.

20. The non-transitory machine-readable storage medium of claim 17, wherein the machine-readable storage medium operates from the set-top box.

\* \* \* \* \*